(12) United States Patent
Shu et al.

(10) Patent No.: US 6,960,896 B1
(45) Date of Patent: Nov. 1, 2005

(54) PROGRAMMABLE HIGH-SPEED MOTOR TORQUE CONTROLLER

(75) Inventors: Ying-Haw Shu, Taipei (TW); Pei-Chang Chiang, Taipei (TW); Pin-Yen Ma, Taipei (TW)

(73) Assignee: Welltek Energy Co., Ltd., Taipei (TW)

(*) Notice: Subject to any disclaimer, the term of this patent is extended or adjusted under 35 U.S.C. 154(b) by 0 days.

(21) Appl. No.: 10/866,631

(22) Filed: Jun. 14, 2004

(51) Int. Cl.⁷ .............................................. H02P 7/00
(52) U.S. Cl. ................. 318/432; 318/254; 318/569; 318/599; 318/138; 318/434; 388/804
(58) Field of Search ................. 318/432, 569, 318/599, 254, 811, 138, 600, 434; 388/819, 388/821, 822, 823, 804, 811

(56) References Cited

U.S. PATENT DOCUMENTS

| | | | | |
|---|---|---|---|---|
| 5,019,757 A | * | 5/1991 | Beifus | 318/254 |
| 5,592,058 A | * | 1/1997 | Archer et al. | 318/254 |
| 5,959,419 A | * | 9/1999 | Sugiyama | 318/293 |
| 5,986,419 A | * | 11/1999 | Archer et al. | 318/254 |
| 6,614,195 B2 | * | 9/2003 | Bushey et al. | 318/135 |

* cited by examiner

Primary Examiner—David Martin
Assistant Examiner—Erick Glass
(74) Attorney, Agent, or Firm—Rosenberg, Klein & Lee

(57) ABSTRACT

A programmable high-speed motor torque controller is provided. A current mode PWM controller widely used in the switching power supply is utilized to perform a real-time hardware control on the operating current of a motor. A microprocessor is used as an operating and controlling interface. By means of the output signal from the switching element of the current-limiting switching controller, the gate switch elements (MOSFET/IGBT) are further controlled so as to control the real operating current of the motor. Therefore, at a cost of approximately one tenth of the digital signal processor, the programmable high-speed motor torque controller can achieve the functions similar to the digital signal processor. Furthermore, a set of built-in power loop switch can be provided to interrupt the current loop of the motor upon reverse rotation without the requirement of power output, thereby largely reducing the drag force of motor upon reverse rotation.

8 Claims, 6 Drawing Sheets

PROGRAMMABLE HIGH-SPEED MOTOR TORQUE CONTROLLER

BACKGROUND OF THE INVENTION

1. Field of the Invention

This invention relates to a programmable high-speed motor torque controller, and in particular, to a programmable high-speed motor torque controller, which is artfully integrated with a high-speed pulse-width-modulation IC (PWM IC) and the programmable microprocessor (MCU) so as to achieve a quick power-saving, safe and reliable effect.

2. Description of the Prior Art

For the purpose of reducing the electric conversion loss, the present motor controllers are entirely based on the scheme of the pulse-width-modulation (PWM). Normally, there are three possible solutions to implement a robust PWM control scheme, which are the simple PWM IC, the microprocessor (MCU) with PWM generator, and the digital signal processor (DSP). However, the existing technologies or components associated with the PWM application all have some drawbacks or restrictions described as follows.

Firstly, a simple PWM IC is able to provide the basic function of power conversion. With the development of power electronics, its switching frequency is up to 500 KHz. Moreover, the built-in feedback control circuit of the PWM IC is able to provide basic output control of constant voltage or constant current. In addition, some of the PWM ICs even build in the high-voltage gate driver and the input port of the reference signal. However, since the possible supporting functions of such control chip are defined at the chip-designing stage, such simple PWM IC always fails to appropriately meet the specific requirements of the industry applications. For example, there is a set of electronic switch is normally used to cut off the current path for the safety concern of e-bike application if there is no power outputted from the motor. However, it is difficult for the current PWM IC to achieve such simple function. Besides, the PWM ICs with the high-voltage gate driver are not cost-effective.

Secondly, a portion of the current MICROPROCESSOR built-in a PWM generator is able to perform the limited motor control. However, due to the limitation of the computing resource, such MICROPROCESSOR generally fails to perform the real-time control coinciding with the practical state of a high-speed current-variance. Doubtless, the frequency of the entire switching circuit is limited, and its efficiency is disagreeable. In addition, such that the electrical system and the motor are normally noisy and power wasteful as the electrical system is forced to switch within the audio frequency range (<20 KHz).

Thirdly, as regards the digital signal processor (DSP) with the PWM generator, nowadays, only a few manufacturers can provide such specified DSPs for motor controllers. Since they are not widely used, they are still not cost-effective. In addition, for a purpose of rapidly modulating the control statuses, these digital signal processors should be operated at an extremely high speed. In other words, they are not suitable to a low-power control system.

Fourthly, as regards the drag force of the motor upon reverse rotation, as shown in FIG. 1 which illustrates the architecture of an existing motor controller, a free wheeling diode 10 should be provided on both input terminals of the motor 11. In this manner, a relief loop of the inductive current of the motor 11 is offered to prevent other components from breakage due to the inductive voltage. However, when the motor 11 is reversely rotated, the free wheeling diode 10 will be forwardly conducted, thereby imposing a strong braking-drag effect. Such effect is disadvantageous for the electrical bicycle or the motorcycle to drive back.

Accordingly, the above-described prior art product is not a perfect design and has still many disadvantages to be solved.

In views of the above-described disadvantages resulted from the conventional motor torque controller, the applicant keeps on carving unflaggingly to develop a programmable high-speed motor torque controller according to the present invention through wholehearted experience and research.

SUMMARY OF THE INVENTION

These features and advantages of the present invention will be fully understood and appreciated from the following detailed description of the accompanying Drawings.

An object of the invention is to provide a programmable high-speed motor torque controller, which is integrated with the rapid and safe operating functions of a pulse width modulation IC (PWM IC) and the power-saving and programmable functions of the microprocessor (MCU).

Another object of the invention is to provide a programmable high-speed motor torque controller for achieving the efficacy of reducing the operational drag force of the motor upon rotation by means of a built-in power loop switch element.

The above objects of the present invention can be achieved by using a programmable high-speed motor torque controller. The programmable high-speed motor torque controller is integrated with the rapid and safe operating functions of a pulse width modulation IC (PWM IC) and the power-saving and programmable function of the microprocessor (MCU) so as to construct a new motor control circuit. At a cost of approximately one tenth of the digital signal processor, the programmable high-speed motor torque controller can achieve the functions similar to the digital signal processor. The electronic gate switches (N type of metal silicon oxide field effect transistor, N-MOSFET) are not directly controlled by the microprocessor. Whereas, via the operation of the internal program, the built-in PMW generator of the microprocessor outputs the pulse width required for current control. In the current comparator, it is compared with the real-time current of the motor upon rotation. By means of the over current protection, a current-limiting PWM IC will control whether the motor continuously outputs electricity. In addition, a set of built-in power loop switch can be provided to interrupt the current loop of the motor upon reverse rotation without the requirement of power output, thereby largely reducing the drag force of motor upon reverse rotation.

DETAILED DESCRIPTION OF THE PREFERRED EMBODIMENT

Figure 1:
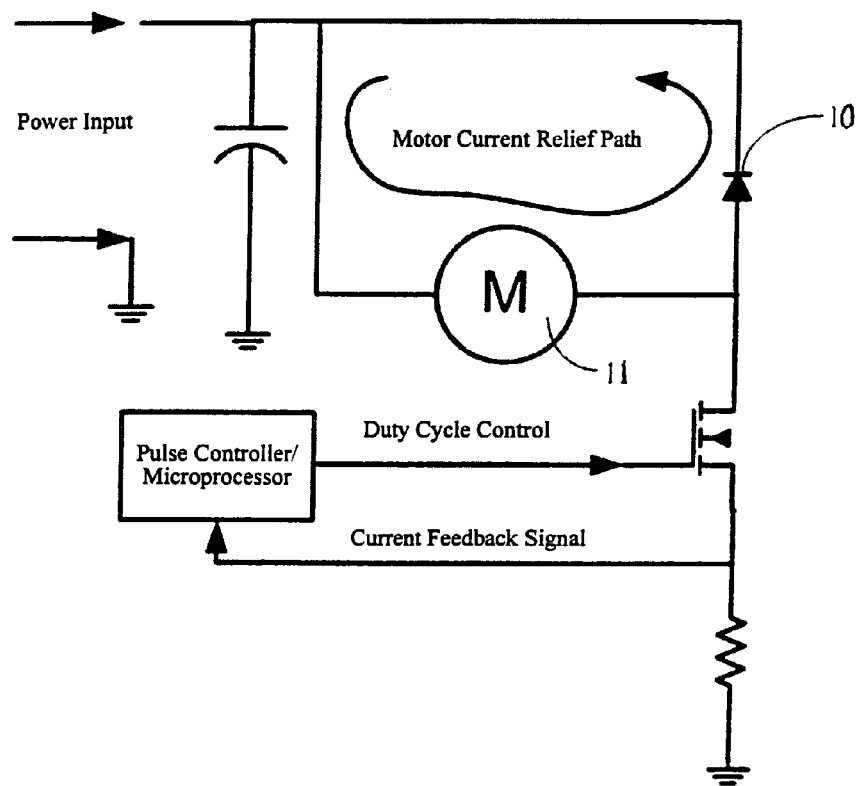
FIG. 1 is a diagram illustrating circuit architecture of a conventional motor torque controller.
Figure 2:
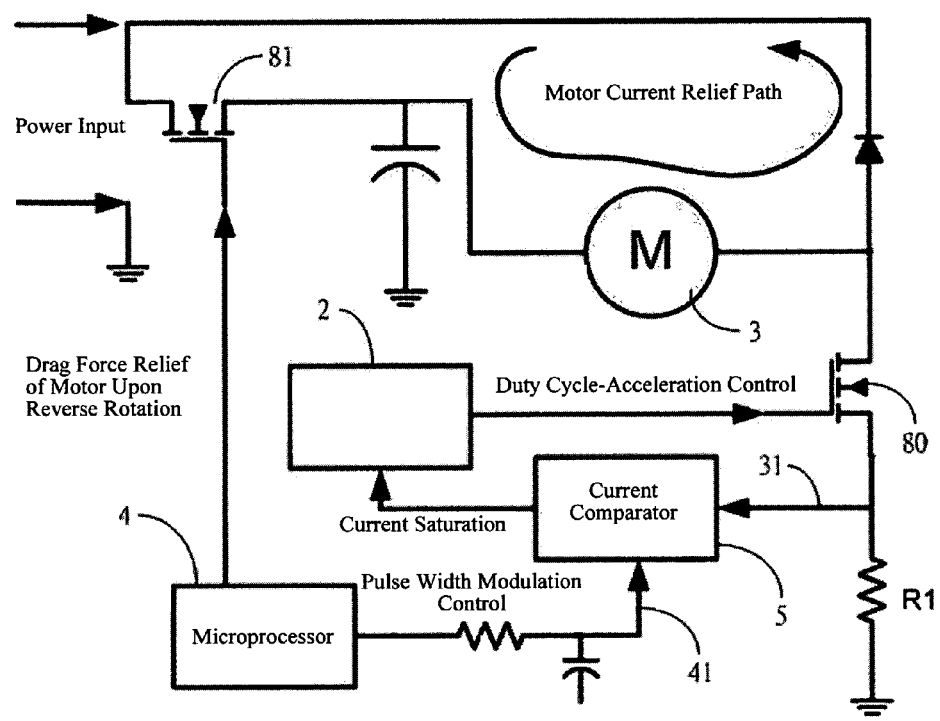
FIG. 2 is a diagram illustrating circuit architecture of a programmable high-speed motor torque controller according to the present invention.

Referring to FIG. 2, the programmable high-speed motor torque controller provided by the invention is consisted essentially of:

a current-limiting switching controller 2 (PMW IC), having therein a current monitoring circuit for determining whether the real-time current exceeds a current threshold value (e.g. a monitoring voltage) according to a voltage drop resulted from the current passing through a micro-resistor (shunt) R1; if it is detected that the current exceeds the threshold value, the output of a first electronic gate switch 80 is closed; if a signal absolutely higher than this monitoring voltage is used as a fully-closed signal (at a logic state of "0") or a zero voltage is used as a fully-open signal (at a logic state of "1"), the input pin of the current-limiting signal can be used to control the switching actions of the current-limiting switching controller 2, and under an operating mode with accelerating or progressively increasing torque of a motor 3 at a fully switch-on status, an optimal efficiency is achieved at any time when the first electronic gate switch 80 is turned on; since this current-limiting switching controller 2 is simple in the desired functions, the object of the present invention can be achieved by using a PWM IC with cost-effectiveness, low power consumption and speediness;

a microprocessor 4, inputting therein a digital or analog signal, controlled by an external signal, and producing a corresponding current command 41 according to an internal control program written into the microprocessor 4; wherein an accurate current command 41 is outputted into the downstream current comparator 5 via a medium/low speed of pulse generator built in the microprocessor 4; since the main function of the microprocessor 4 is to perform an operation on the external commands and respond to the real-time pulse width, a conventional microprocessor with low power consumption and cost effectiveness is desirable;

a current comparator 5, for rapidly distinguishing the difference between the real-time current signal 31 of the motor 3 and the current command 41, wherein the current of the motor is immediately corrected at each switching period so as to largely increase the accuracy and efficiency of the torque control; and a second electronic gate switch 81 (N-MOSFET), used as a switch element of the current loop of the motor 3 so as to overcome the problem of releasing drag force upon reverse rotation and provide a further protection effect if the first electronic gate switch 80 (N-MOSFET) downstream of the current-limiting switching controller 2 has a failure; wherein the second electronic gate switch 81 has no similar problems associated with flashover caused from the mechanical switch element or relay, and thus the current above the protective site can be shut down more quickly so as to enhance the reliability of the electronic product; the existing mechanical switch element or relay fails to achieve the long shelf life of the N-MOSFET; moreover, the second electronic gate switch 81 is a power switch element controlled by the microprocessor.

This microprocessor will determine whether the second electronic gate switch 81 is turned on according to the presence or absence of the current command. Furthermore, the motor 3 is protected during use, and the drag force upon reverse rotation is released. When the microprocessor 4 receives a current/torque command from a user interface, the internal control program will determine the frequency and the pulse width of a pulse width modulation generator, which is converted into a voltage-type current command 41 by an outboard circuit and inputted into the current comparator 5. When the first electronic gate switch 80 of the current-limiting switching controller 2 is turned on, the current of the motor 3 will flow through downstream of the micro-resistor R1 so as to generate a transient voltage signal corresponding to a transient current. After the transient voltage signal is processed, it will be inputted into another terminal of the current comparator 5. In such manner, the current comparator 5 can quickly and accurately indicate whether the transient current of the motor 3 is satisfied with the current command 41 via the signals at the logic states of "0" and "1". The current-limiting switching controller 2 is a basic core of the switching control to determine the duty cycle of each period according to the comparing result of the transient current. Since an over current protection (OCP) control strategy is adopted, a regular high-speed PWM IC is suitable.

Figure 3:
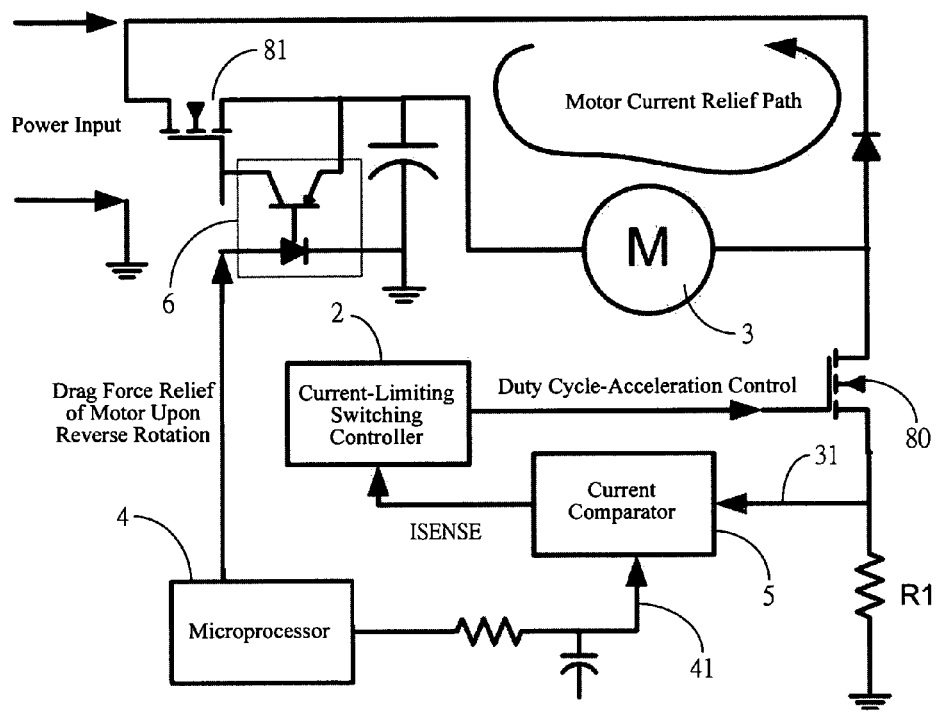
FIG. 3 is a diagram illustrating circuit architecture of a programmable high-speed motor torque controller according to an implementation example of the present invention.

FIG. 3 is a schematic diagram illustrating an implementation example of the present invention. A photo-coupler 6 is cross-connected to a signal switch element on the N-MOSFETM2 so as to be used as an interface of the microprocessor 4 for controlling the switch element N-MOSFETM2. The current-limiting switching controller 2 selected to be use is UC3842 controller, which is widely used in the PC power supply apparatus. The microprocessor is a simple microprocessor with a ringing output. All of the switching control tasks are performed at a fixed frequency beyond the audio frequency. The maximum rating current can be larger than 50 Amps, and the efficiency thereof is higher than 95%.

Figure 4:
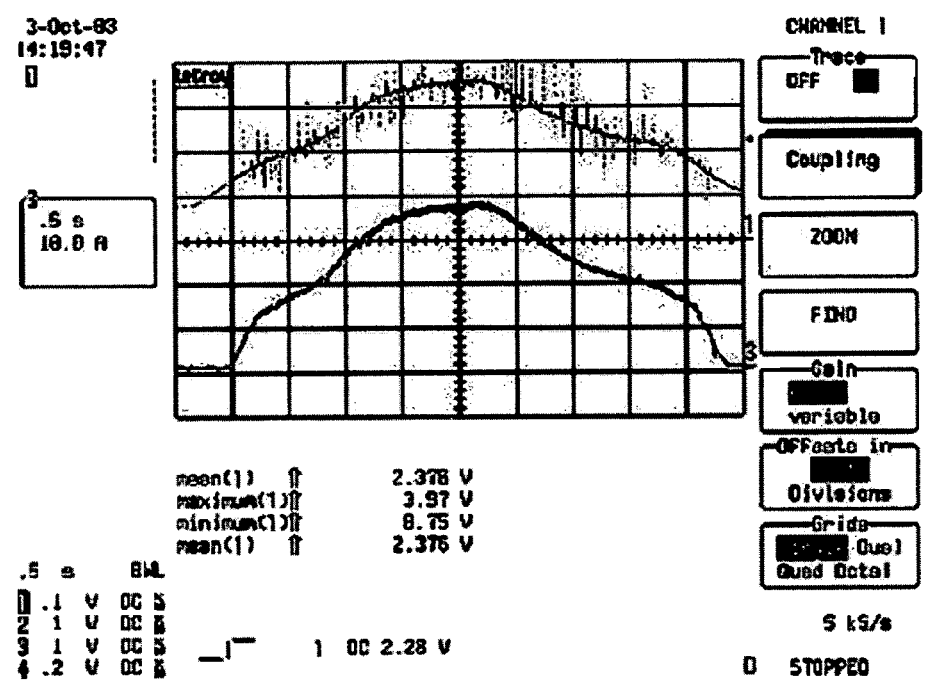
FIG. 4 is a curve plot illustrating the input voltage vs. the current for a motor of a programmable high-speed motor torque controller according to the present invention.

If an external voltage signal is used as the current command, as shown in FIG. 4, after the deviation voltage is deducted, the current inputted into the motor 3 is nearly proportion to the input voltage.

Figure 5:
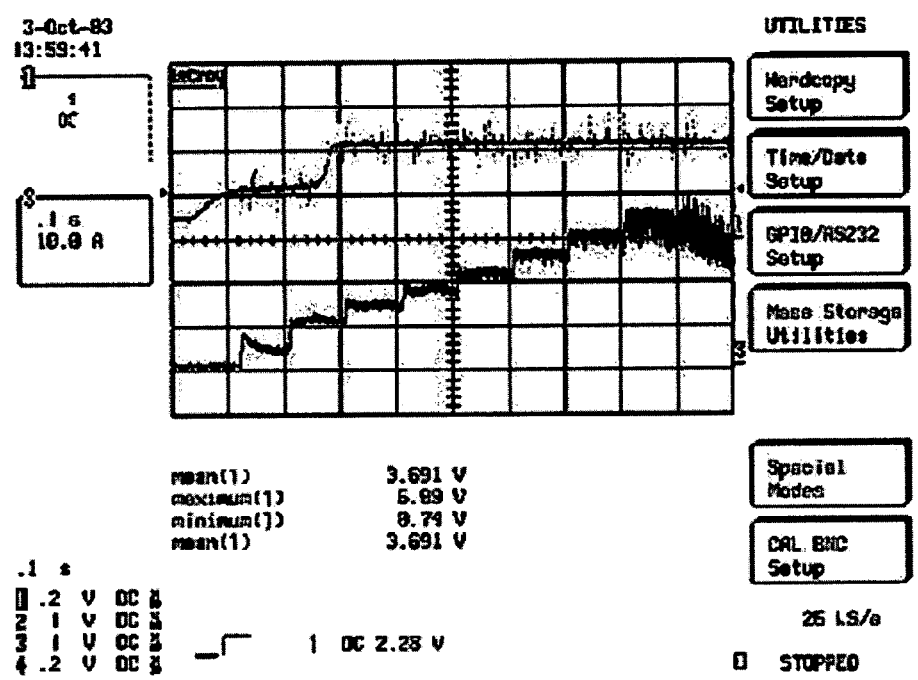
FIG. 5 is a curve plot illustrating the input voltage vs. the current for a motor of a programmable high-speed motor torque controller according to the present invention.

If a soft-starting function is included in the internal program of the microprocessor 4, the current should be increased stepwise when an abruptly increased motor current command is received. It is anticipated the curve plot illustrating the current change for a motor is increased stepwise, as can be seen from FIG. 5. That is to say, this circuit configuration can improve the efficiency and performance of the motor driving system and be implemented in a simple and cost-effective manner.

Figure 6:
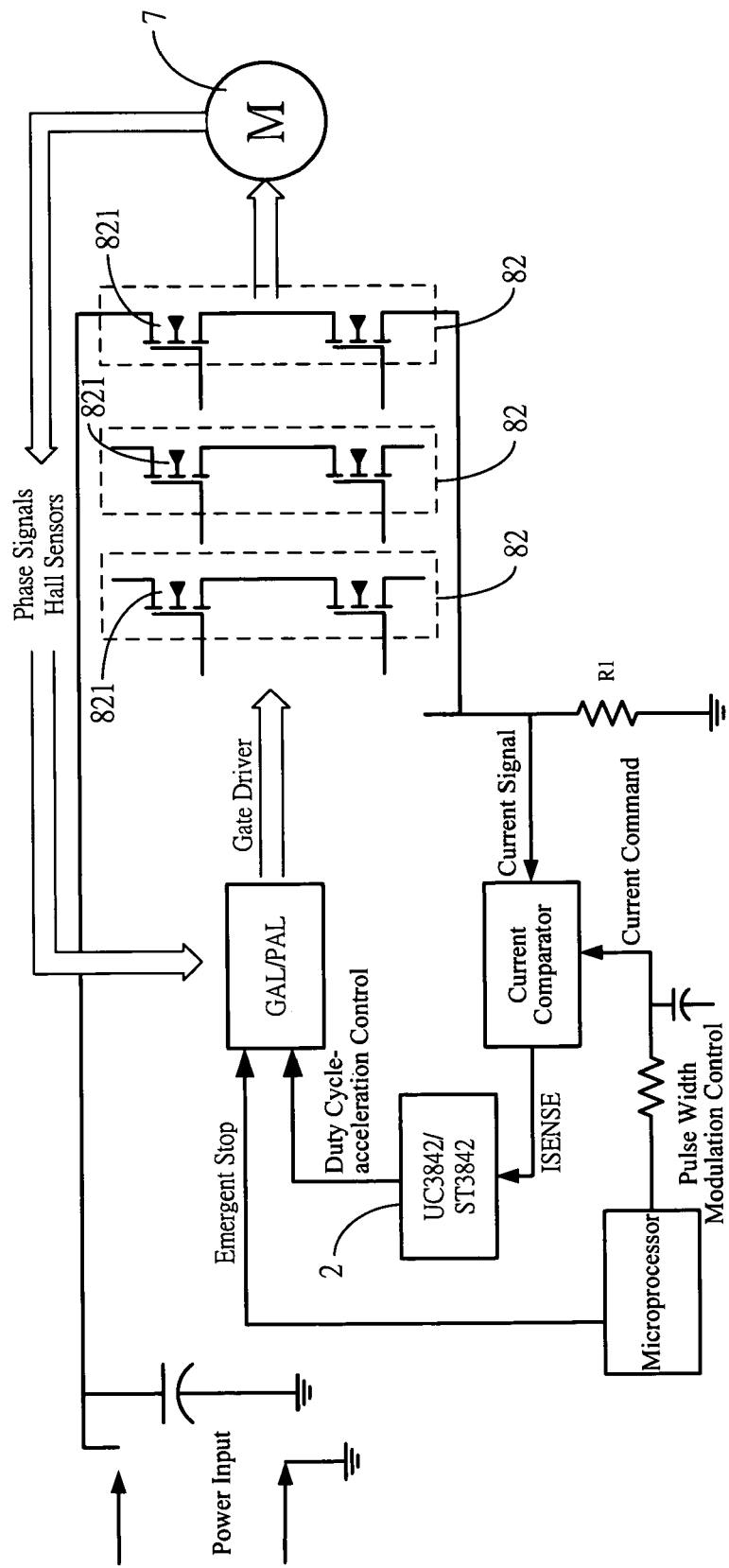
FIG. 6 is a diagram illustrating another circuit architecture of a programmable high-speed motor torque controller according to the present invention.

FIG. 6 is a diagram illustrating another circuit architecture of the present invention, which is applied in a three-phase brushless DC motor 7. The difference is that the three-phase motor 7 needs to take account of the phase conversion of the three-phase current supply. By means of a programmed logic operation, the duty cycles of three sets of electronic gate switch 82 (N-MOSFET) are determined. However, the switching duty cycle of the upstream electronic gate 821 is determined according to the command fed back from the current detecting circuit to the current-limiting switching controller 2 so as perform the current control of the three-phase brushless DC motor 7.

The programmable high-speed motor torque controller provided by the present invention, when comparing with other previous conventional technologies, has following advantages:
1. The programmable high-speed motor torque controller of the present invention is integrated with the rapid and safe operating functions of a pulse width modulation IC (PWM IC) and the power-saving and programmable function of the microprocessor (MCU).
2. The present invention can achieve the efficacy of reducing the operational drag force of the motor upon rotation by means of a built-in power loop switch element.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A programmable high-speed motor torque controller, comprising:
   a current-limiting switching controller, for determining whether the real-time current exceeds a current threshold value according to a voltage drop resulted from the current passing through a micro-resistor, when a first electronic gate switch is turned on, the current of the motor flowing downstream of said micro-resistor so as to generate a transient voltage signal corresponding to a transient current, said transient voltage signal being processed and then inputted into a current comparator;
   a microprocessor controlled by an external signal and producing a corresponding current command according to an internal control program written into said microprocessor, when said microprocessor receives a current/torque command from a user interface, said internal control program determining the frequency and the pulse width of a pulse width modulation generator, which is converted into a voltage-type current command by an outboard circuit and inputted into a current comparator;
   a current comparator for rapidly distinguishing the difference between the real-time current of the motor and the current command of said microprocessor, wherein the current of the motor is immediately corrected at each switching period so as to largely increase the accuracy and efficiency of the torque control; and
   a second electronic gate switch controlled by said microprocessor and used as a switch element of the current loop of the motor.

2. The programmable high-speed motor torque controller according to claim 1, wherein said current-limiting switching controller has built-in a set of current-monitoring circuit.

3. The programmable high-speed motor torque controller according to claim 2, wherein the output of said first electronic gate switch is closed, if said current-monitoring circuit of said current-limiting switching controller detects that the current exceeds said threshold value; if a signal absolutely higher than said monitoring voltage is used as a fully-closed signal (at a logic state of "0") or a zero voltage is used as a fully-open signal (at a logic state of "1"), the input pin of the current-limiting signal is used to control the switching actions of said current-limiting switching controller; and under an operating mode with accelerating or progressively increasing torque of said motor at a fully switch-on status, an optimal efficiency is achieved at any time when said first electronic gate switch is turned on.

4. The programmable high-speed motor torque controller according to claim 1, wherein said microprocessor determines whether said second electronic gate switch is turned on according to the presence or absence of said current command so as to protect said motor during use and release the drag force of said motor upon reverse rotation.

5. The programmable high-speed motor torque controller according to claim 1, wherein each of said first and second electronic gate switches is a N-MOSFET.

6. The programmable high-speed motor torque controller according to claim 1, wherein said second electronic gate switch can overcome the problem of releasing motor drag force upon reverse rotation and provide a further protection effect on said motor.

7. The programmable high-speed motor torque controller according to claim 1, wherein said current comparator quickly and accurately indicates whether said transient current of said motor is satisfied with said current command via the signals at the logic states of "0" and "1".

8. The programmable high-speed motor torque controller according to claim 1, wherein if said motor is a three-phase brushless DC motor, the phase conversion of the three-phase current supply is taken account of; by means of a programmed logic operation, the duty cycles of three sets of electronic gate switch are determined; whereas, the switching duty cycle of the upstream electronic gate is determined according to the command fed back from the current detecting circuit to said current-limiting switching controller so as perform the current control of said three-phase brushless DC motor.

* * * * *